United States Patent [19]
Davis

[11] Patent Number: 5,949,170
[45] Date of Patent: Sep. 7, 1999

[54] METHOD AND APPARATUS FOR REDUCING VOLTAGE STRESSES IN ELECTRIC MACHINE

[75] Inventor: Rex Mountford Davis, Loughborough, United Kingdom

[73] Assignee: Switched Reluctance Drives, Ltd, Harrogate, United Kingdom

[21] Appl. No.: 08/473,290

[22] Filed: Jun. 7, 1995

[30] Foreign Application Priority Data

Apr. 10, 1995 [GB] United Kingdom .................... 9507391

[51] Int. Cl.⁶ ............................ H02K 15/02; H02K 3/18; H02K 3/041; H01F 27/28
[52] U.S. Cl. ........................ 310/208; 310/168; 310/180; 310/203; 29/605; 336/189
[58] Field of Search ..................................... 310/180, 168, 310/203, 206, 207, 208; 336/69, 189, 190, 191; 235/213; 29/605

[56] References Cited

U.S. PATENT DOCUMENTS

| | | | |
|---|---|---|---|
| 2,201,845 | 5/1940 | Wieseman | 171/252 |
| 2,905,911 | 9/1959 | Kurita | 336/70 |
| 2,930,014 | 3/1960 | Van Der Hoek et al. | 310/190 |
| 3,713,061 | 1/1973 | Weber | 336/69 |
| 4,017,815 | 4/1977 | Sauer | 336/70 |
| 4,376,904 | 3/1983 | Horrigan | 310/208 |
| 4,454,492 | 6/1984 | Thackray | 336/69 |
| 4,677,332 | 6/1987 | Heyraud | 310/184 |
| 4,794,361 | 12/1988 | Young | 336/189 |
| 4,916,346 | 4/1990 | Kliman | 310/216 |
| 4,918,831 | 4/1990 | Kliman | 29/598 |
| 5,023,502 | 6/1991 | Johnson | 310/261 |
| 5,053,666 | 10/1991 | Kliman | 310/261 |
| 5,111,096 | 5/1992 | Horst | 310/168 |
| 5,166,569 | 11/1992 | Shervington et al. | 310/261 |
| 5,323,080 | 6/1994 | Shahamat et al. | 310/261 |

FOREIGN PATENT DOCUMENTS

| | | | |
|---|---|---|---|
| 2 172 443 | 9/1986 | European Pat. Off. | H02K 1/28 |
| 0 157 526 B1 | 5/1990 | European Pat. Off. | H02K 19/24 |
| 724 113 | 8/1942 | Germany . | |
| 6 62540 | of 1994 | Japan | H02K 1/24 |

OTHER PUBLICATIONS

European Search Report dated Nov. 25, 1997 for corresponding European patent application 96302409.6.

Rhode Nelson and Gary Skibinsky, Allen Bradley Co., *Solutions To Motor Insulation Failures*, Power Transmission Design, Aug. 1995.

Stephenson and Blake, *The Characteristics, Design and Applications of Switched Reluctance Motors and Drives*, (Jun. 1993, Nuremberg, Germany).

Hutton & Miller, *Use of Flux Screens in Switched Reluctance Motors*, Sep. 1989, pp. 312–316, Proc. EMD, London.

Potoradi et al., *Transient Overvoltages Caused by Switching of High Voltage Asynchronous Machines and their Distribution in Stator* Sep. 5–8, 1994, pp. 649–; vol. 2, Proc. Int. Conf. on Electrical Machines, Paris.

Cornick & Thompson, *Steep–Fronted Switching Voltage Transients and their Distribution in Motor Windings Part 1: System Measurements of Steep–Fronted Switching Voltage Transients*, Mar. 1982, vol. 129, No. 2, IEEE Proc.

Bonnett, A., Analysis of the Impact of Pulse–Width Modulated Inverter Voltage Waveforms on A.C. Induction Motors, U.S. Elecltrical Motors Division of Emerson Electric.

Takahashi et al., *Motor Lead Length Issues for IGBT PWM Drives*, Conf. Record of 1995 IEEE Annual Pulp and Paper Technical Conference, IEEE Cat No. 95CH3572-5, pp. 21–27.

*Primary Examiner*—Nestor Ramirez
*Assistant Examiner*—Tran N Nguyen
*Attorney, Agent, or Firm*—Arnold White & Durkee

[57] ABSTRACT

A method and apparatus for reducing winding failures in reluctance machines wherein winding coils for the switched reluctance motor are formed and positioned such that the turn-to-ground capacitance of the portion of the winding coil coupled to an electronic motor controller is reduced. Alternate embodiments are disclosed wherein additional insulation, and capacitive voltage distributors are provided to enable a switched reluctance motor to better handle the voltage stresses produced when high frequency or high dV/dt voltage pulses are provided to the motor.

10 Claims, 11 Drawing Sheets

METHOD AND APPARATUS FOR REDUCING VOLTAGE STRESSES IN ELECTRIC MACHINE

CROSS-REFERENCE TO RELATED APPLICATIONS

This reference is related to co-pending U.S. patent application Ser. No. 08/478,249, filed on Jun. 7, 1995 by the same inventor entitled "METHOD AND APPARATUS FOR REDUCING WINDING FAILURES IN ELECTRIC MOTORS" which is incorporated by reference.

FIELD OF THE INVENTION

The present invention relates to methods and structures for reducing voltage stresses in electric drive systems and, in particular, in switched reluctance machines.

BACKGROUND OF THE INVENTION

Adjustable speed motor systems typically involve the use of specially designed electronic motor controllers coupled to the phase windings of a multi-phase motor via connection cables. An exemplary arrangement is illustrated in FIG. 1 where a three phase motor 10 is coupled to an electronic controller 12 by three connection cables 14, 16 and 18. In operation, cables 14, 16 and 18 act as transmission lines for signals which may take the form of voltage waveforms, provided by the electronic controller 12 to the motor 10.

In many systems, the electronic controller 12 controls the speed or torque of the motor 10 through the application of high frequency voltage pulses to the motor via the connection cables 14, 16 and 18. The frequencies of these applied pulses can be quite high and are often in the kilohertz range. Pulse frequencies of the order of 20 kHz are particularly common, as the operation of switching devices at such speeds does not produce audible noise. The high frequency pulses often take the form of voltage waveforms having steep edges where the voltages change abruptly from a relatively low voltage level to a relatively high voltage level (or vice versa) over a short period of time. The rate of change of the applied voltage over time is mathematically represented by the notation dV/dt. The steeper the edges that define the voltage pulses of the voltage waveform, the higher the value of dV/dt.

The nature of the phase windings in most electric motors causes the motor to appear as a highly inductive load to the connection cables 14, 16 and 18 coupling the motor 10 to the controller 12. At the high switching frequencies and high dV/dt of modern controllers, the inductive load of the motor appears, at least transiently, as an open circuit. Accordingly, the application of high frequency voltage pulses with steep edges (i.e., a high dV/dt) to the motor can result in extreme voltage transients at the points where the connection cables 14, 16 and 18 are coupled to the phase windings of the motor 10. In some systems, the magnitude of these transient voltages can rise to nearly twice the magnitude of the applied voltage pulses.

In new motors, the insulating coating (e.g. of enamel) covering the wiring comprising the phase windings is generally sufficient to handle the voltage spikes caused by the application of the high frequency, high dV/dt voltage pulses. Over time, however, the insulating properties of the enamel coating degrade and a point may be reached where it is no longer capable of handling the voltage spikes resulting from the high frequency pulses. In such instances, the failure of the insulating coating can result in a shorting of winding turns when the voltage stresses caused by the high frequency pulses are applied to the phase windings. Experience has shown that this shorting of winding turns occurs most often in the turns physically adjacent the point where the connection cable is connected to the phase windings. These shorted turns can create a closed circuit where circulating currents are produced. These circulating currents give off heat that tends to further degrade the insulating properties of the wire comprising shorted turns and the winding turns physically adjacent the shorted turns. This heat, in turn, results in additional insulation failures, which result in additional shorted turns. A vicious cycle is instigated which usually results in extreme damage to the motor winding and failure of the motor itself.

The problem of voltage stress induced winding failures in motors has been recognized within the motor art and has been addressed, for example, in D. Potoradi et. al, "Transient Overvoltages Caused by Switching of High Voltage Asynchronous Machines and their Distribution in Stator Windings," 2 *Proceedings of the International Conference of Electrical Machines* 644–49 (Sep. 5–8, 1994) and K. J. Cornick et al., "Steep-fronted Switched Voltage Transients and their Distribution in Motor Windings" 136 *IEE Proceedings* 45–55 (March 1982).

The problem of voltage stress induced winding failure can occur in any motor system in which high frequency voltage pulses or voltage pulses having a high dV/dt. are applied to a motor. In particular, this problem can appear in AC induction motor systems, permanent magnet motor systems, and reluctance motor systems. To date, efforts to resolve this problem have not been adequately successful. This invention provides a solution to the winding failure problem particularly applicable to reluctance motor systems, although not necessarily limited thereto. The present invention is defined in the accompanying independent claims. Preferred features are recited in the claims respectively dependent thereon.

SUMMARY OF THE INVENTION

In one embodiment of the present invention, a method and apparatus are provided for reducing the risk of winding failures in switched reluctance machines by reducing the turn-to-stator capacitance of the winding turns of the phase windings connected to an external controller via the machine terminals. This reduction in the turn-to-stator capacitance of the phase windings distributes voltage stresses more evenly throughout the phase winding, resulting in a reduced risk of winding failures.

In another embodiment of the present invention, additional insulation in the form of wrapped sheets or insulating sleeves is provided for the outermost winding turns of the phase windings of a switched reluctance machine. In this embodiment, the additional insulation enables the outermost winding turns to better handle the voltage stresses resulting from the high frequency voltage pulses associated with the machine windings. In still another embodiment of the present invention, a sheet of insulating material is positioned between the outermost layer of winding turns and the next inwardly adjacent layer.

In yet another embodiment of the present invention, a novel capacitive voltage distributor is positioned between the outermost layer of winding turns and the next inwardly adjacent layer of winding turns in a switched reluctance machine. This capacitive voltage distributor distributes more evenly the voltage stresses resulting from the application of voltage pulses to the motor throughout the motor winding, thereby reducing the risk of winding failures caused by concentrated voltage stresses.

BRIEF DESCRIPTION OF THE DRAWINGS

The present invention can be put into practice in various ways some of which will be described by way of example with reference to the accompanying drawings in which.

Similar reference characters indicate similar parts throughout the several views of the drawings.

DETAILED DESCRIPTION OF THE INVENTION

Figure 1:
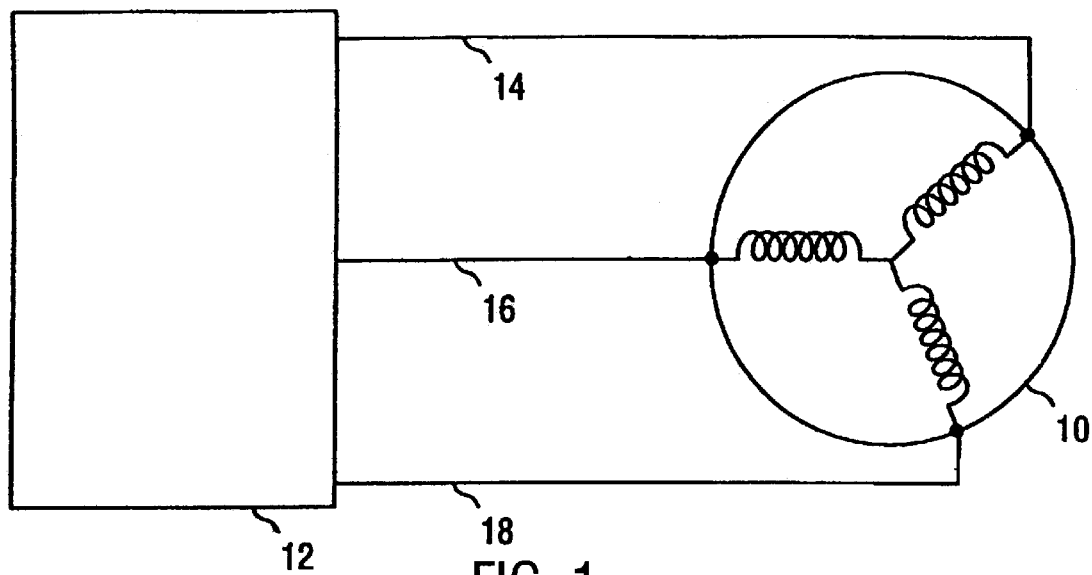
FIG. 1 illustrates an exemplary adjustable speed machine system which may be used in connection with the methods and apparatus of the present invention.
Figure 2:
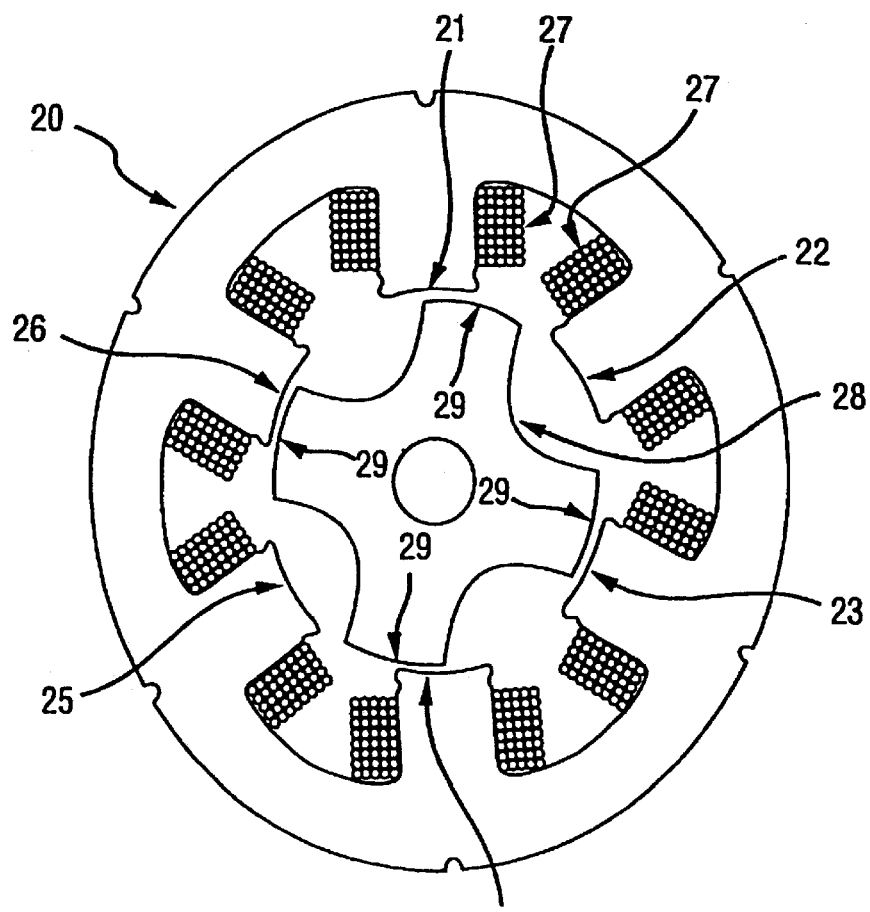
FIG. 2 illustrates a typical reluctance machine.

FIG. 2 illustrates a typical reluctance machine having a rotor 28, including four rotor poles 29 and a stator 20 including six stator poles 21–26. Associated with each stator pole is a wound coil of wire 27. In the illustrated machine, the coils of opposing stator poles are coupled together to form three phases: phase A (coils from poles 21 and 24); phase B (coils from poles 22 and 25); and phase C (coils from poles 23 and 26). In the example illustrated in FIG. 2, when phase A is energized, electric current will flow through its coils such that stator pole 21 becomes, in one example, an inward-pointing electromagnet of positive polarity and stator pole 24 becomes an electromagnet of negative polarity. When the machine is operating in a motor, these combined electromagnets cause a force to be exerted on the rotor 28 tending to cause it to rotate in a counterclockwise direction. Through sequential energization of the phase windings, rotation of rotor 28 can be initiated and maintained resulting in the production of torque along a shaft (not shown) coupled to the rotor.

For the sake of convenience the following description refers to reluctance motors. The skilled person will be aware that the construction of a switched reluctance generator is the same as that of a switched reluctance motor. Thus, the invention is applicable to both generators and motors to substantially equal effect. Although the following discussion focuses on switched reluctance motors, the present invention is applicable to all forms of reluctance machines, and other machines having phase winding arrangements similar to those of switched reluctance machines.

Unlike many electric motors, such as induction motors and most permanent magnet motors, the phase windings of switched reluctance motors are not contained in stator slots. This essential difference between switched reluctance motors and more common electric motors is illustrated in FIGS. 3A and 3B.

Figure 3A:
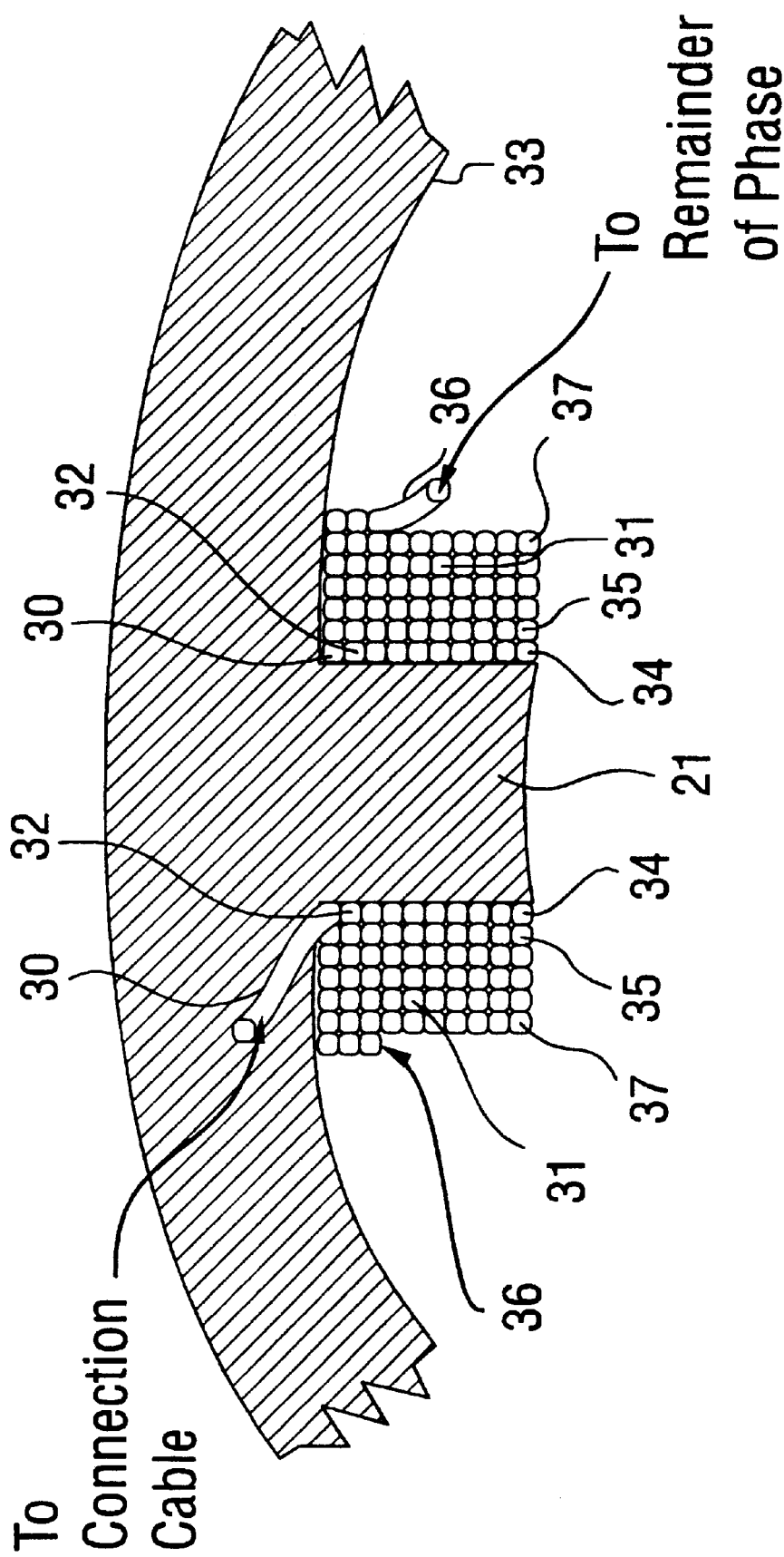
FIG. 3A generally illustrates in cross section a portion of a phase winding associated with one pole of a switched reluctance motor.

FIG. 3A generally illustrates in cross section the portion of a phase winding associated with one pole of a switched reluctance motor. The portion of the winding associated with the opposing pole is substantially identical. The turns encircle the opposing pole in the same direction such that electromagnets of opposing polarities are created when the phase winding is energized.

Referring to FIG. 3A, several turns of enamel coated wire (typically copper) are wrapped around a stator pole 21 of a switched reluctance motor. These turns make-up a unit that is referred to as a winding coil. The turns are typically wound from the inside out such that the first turn is at the position indicated by turn 30 in an inter-pole region 33. The next turn is positioned at the adjacent position indicated by turn 32, with the further turns being wound in adjacent positions until the last turn for the layer (position 34) is wound. The winding then proceeds to another layer, this one being wound from the outside (position 35) inwards to the base of the stator pole. The turns are then wound in the same fashion until the desired number of turns are obtained. Typically extra lengths of wire extend from the first turn 30 to form a first end adapted for connection to a motor terminal and thence to an external electronic motor controller via a connection cable. Similarly, extra lengths extend from the last turn 36 to form a second end adapted for connection to another winding coil of the phase winding.

Figure 3B:
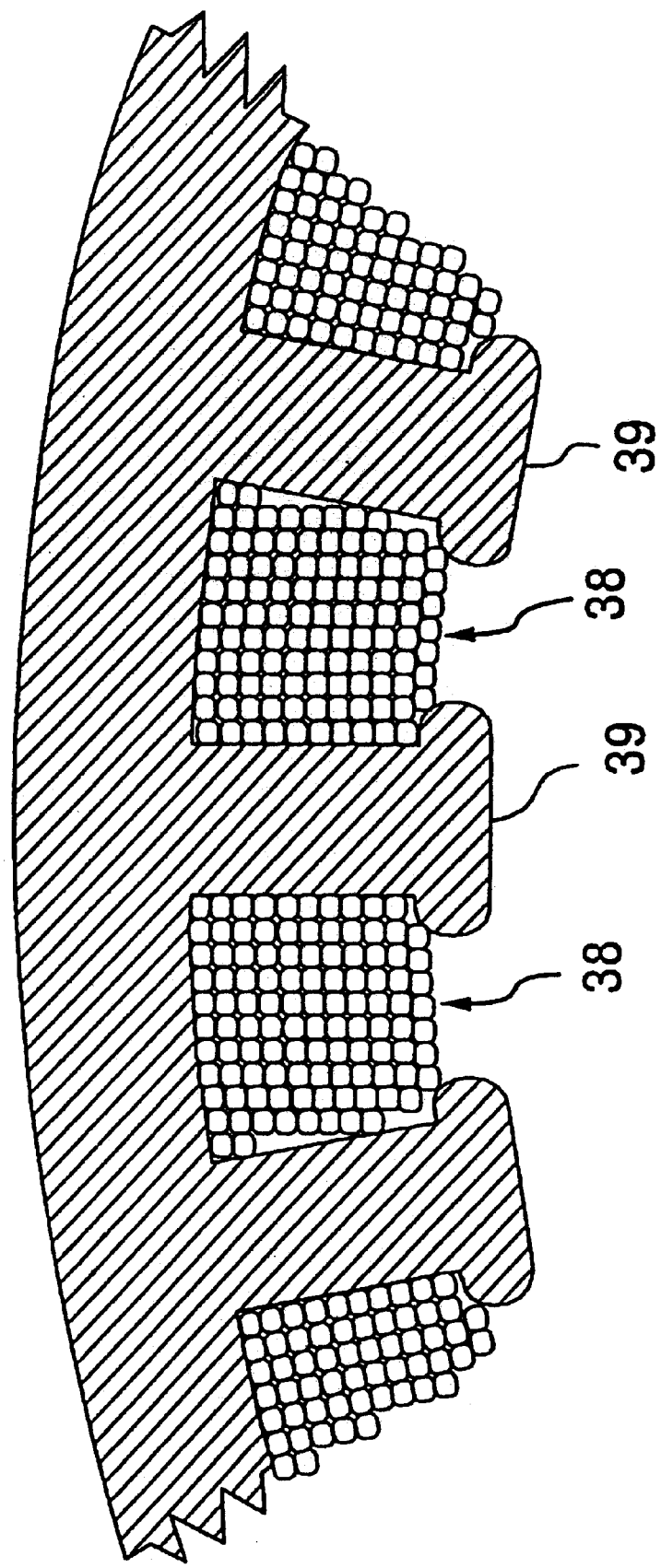
FIG. 3B generally illustrates the winding configuration often found in machines other than switched reluctance motors, such as induction machines and most permanent magnet machines.

FIG. 3B generally illustrates the winding configuration found in many other types of electrical machines, such as induction motors and most permanent magnet motors. In such motors, the wire turns that comprise the phase windings are placed in semi-closed slots 38 formed by inwardly protruding teeth 39.

Unlike the more typical electric motor winding arrangement illustrated in FIG. 3B, the switched reluctance motor does not utilize semi-closed slots. The inventor of the present invention has recognized that the different nature of switched reluctance motors allows for the implementation of novel techniques for reducing voltage stress induced winding failures.

Figure 4A:
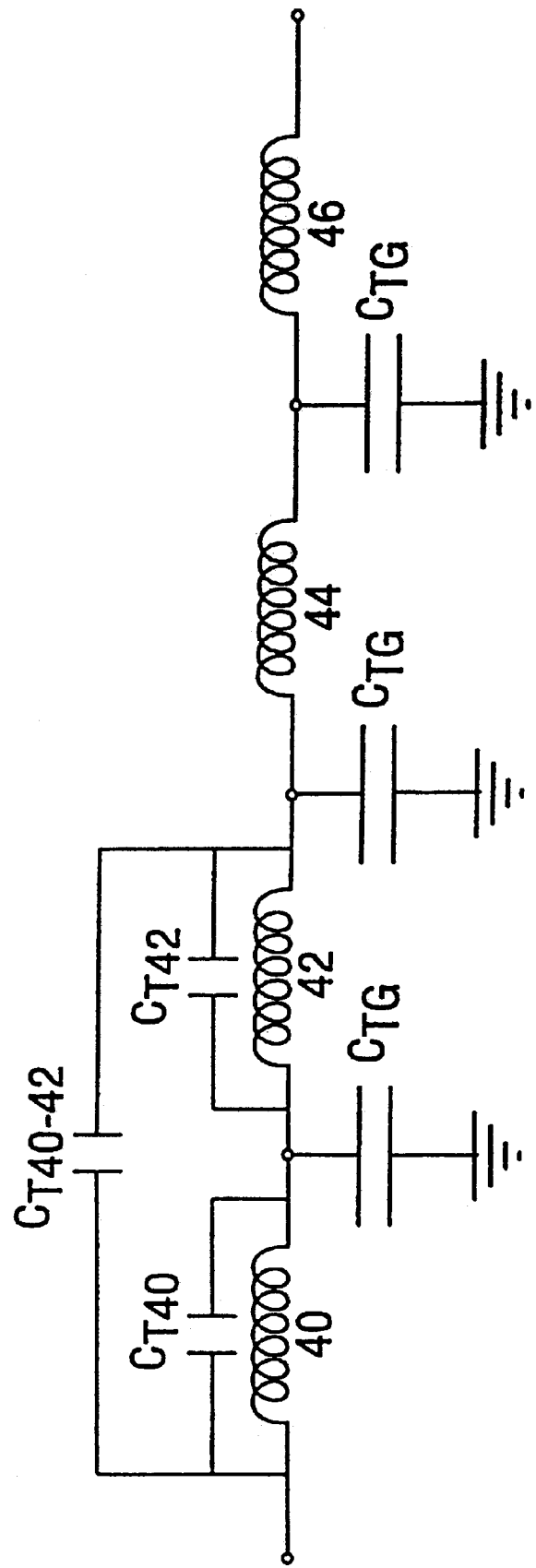
FIG. 4A provides a simplified schematic representation of the first portion of a phase winding of a typical electric machine.

FIG. 4A provides a simplified schematic representation of the first portion of a phase winding in an electric motor, such as a switched reluctance or an induction motor. Generally, the phase winding appears as a number of series connected inductors 40, 42, 44 and 46. Each of these inductors represents a number of winding turns. Associated with each of these inductors are a number of capacitive elements. These capacitive elements represent the capacitances resulting from the nature of motor windings. Capacitors $C_{TG}$ represent the turn-to-ground capacitance resulting from the winding turns' interaction with the stator material around which the winding coils are placed. This stator material is usually coupled to ground. For motors where the stator material is not coupled to ground, the turn-to-ground capacitance $C_{TG}$ is the turn-to-stator material capacitance. Capacitor $C_{T40-42}$ represents the inherent capacitance between neighboring groups of winding turns. Although not illustrated, similar capacitances would be associated with the winding turns represented by inductors 44 and 46. Capacitors $C_{T40}$ and $C_{T42}$ represent the turn-to-turn capacitance resulting from the winding turns interaction with each other. Similar capacitances would be associated with the winding turns represented by inductors 44 and 46. As those skilled in the art will recognize, FIG. 4A illustrates only a portion of the capacitances appearing in motor winding arrangement. The inventor of the present invention has recognized that the combined effect of these capacitances ensures that the worst voltage stresses caused by the high frequency voltage pulses (or waveforms having high dV/dt) occur in the turns of the winding following the coupling of the winding to the connection cables.

Figure 4B:
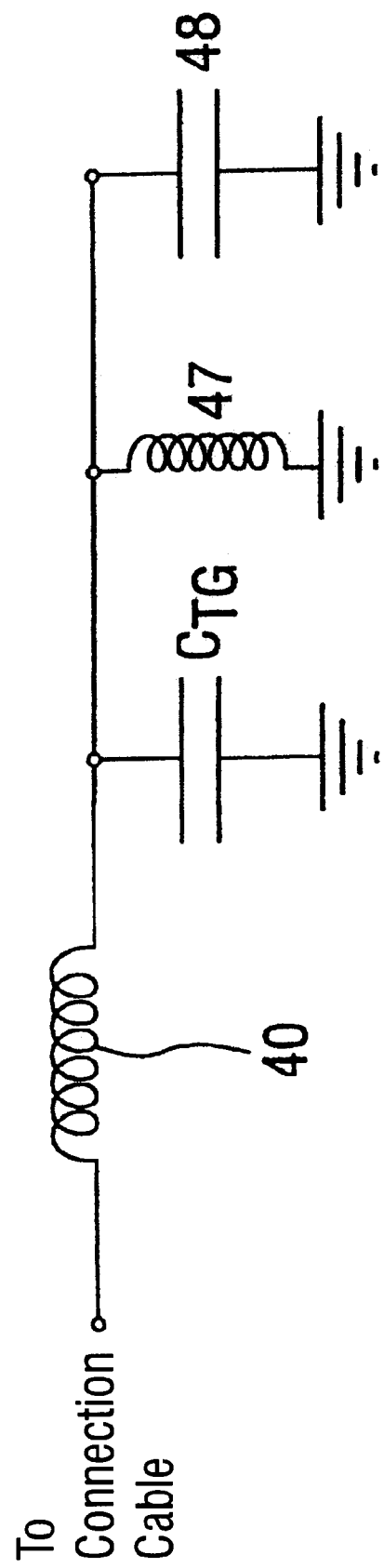
FIG. 4B illustrates a further simplified schematic representation of the first portion of a phase winding of a typical electric machine.

FIG. 4B illustrates a further simplified representation of the first portion of a phase winding of an electric motor. The inductances and capacitances of the winding turns other than turns following the coupling of the winding to the connection cables have been combined for purposes of illustration and are represented by an inductor 47 and a capacitor 48. As in FIG. 4A, the inductor 40 represents the winding turns following the coupling of the winding to the connection cable and capacitor $C_{TG}$ represents the turn-to-ground capacitance of these turns.

Because of the nature of inductive and capacitive circuits, the magnitude of the voltage stresses placed on the inductor 40 when a high dV/dt voltage pulse is applied to the winding will vary with the capacitance of the capacitor $C_{TG}$. As the capacitance of the capacitor $C_{TG}$ increases, the voltage stresses placed on the inductor 40 increase. As the capacitance of the capacitor $C_{TG}$ decreases, so does the voltage stress placed on the inductor 40. This reduction in voltage stress occurs because, as $C_{TG}$ is lowered, the voltage stresses are distributed more evenly between the inductors 40 and 47.

From the above analysis of the simplified circuit of FIG. 4B it may be deduced that a reduction in the turn-to-ground capacitance of turns of a motor phase following the coupling of the winding to the controller and its connection cables will result in a reduction of voltage stresses placed on that portion of the motor winding, and a corresponding reduction in the likelihood of a voltage stress induced failure of the winding. The inventor has developed a novel approach for reducing the turn-to-ground capacitance of the turns of a switched reluctance motor that are coupled to the external controller.

Referring to FIG. 3A, it may be noted that the turn-to-ground capacitance of a winding turn is strongly tied to the relative position of the winding turn with respect to the stator pole 21 and the inter-pole portion 33 of the stator. For example, the winding turn 30 is located physically near pole 21 in the inter-pole region 33, and will have a relatively high turn-to-ground capacitance. Winding turn 31, being located more distant from the stator pole 21 and the inter-pole region 33, has a lower turn-to-ground capacitance than the turn 30. Winding turn 37 has a still lower turn-to-ground capacitance.

Figure 5:
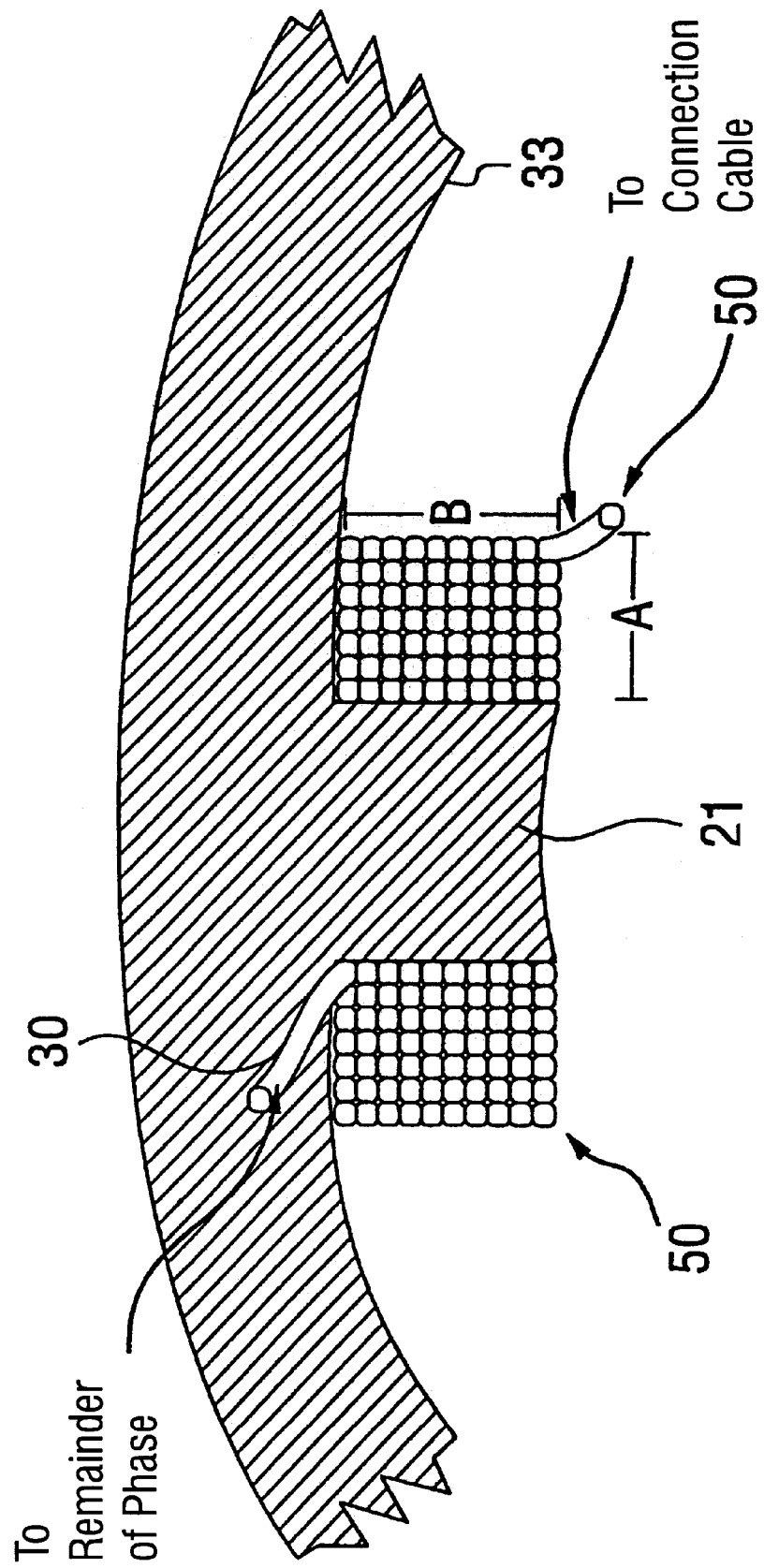
FIG. 5 generally illustrates a coil for a phase winding for a reluctance machine formed and positioned in accordance with the present invention.

According to the present invention, the winding turn having an end coupled to the connection cable for a given phase should be located at the position where the turn-to-ground capacitance in minimized. This is illustrated generally in FIG. 5. Referring to FIG. 5, the winding turn having the lowest turn-to-ground capacitance is the turn 50 located at the position most distant from the pole 21 (distance A) and the inter-pole region 33 (distance B). In the present invention, the wire portion extending from winding turn 50 should be coupled to the motor terminal via the connection cable. Such a winding arrangement minimizes the voltage stresses on the turn 50 by reducing its turn-to-ground capacitance, resulting in a better distribution of the voltage stresses caused by the high frequency or high dV/dt voltage pulses. This distribution in voltage stresses can result in a reduction in the number of motor windings that suffer voltage stress induced winding failure.

Figure 6:
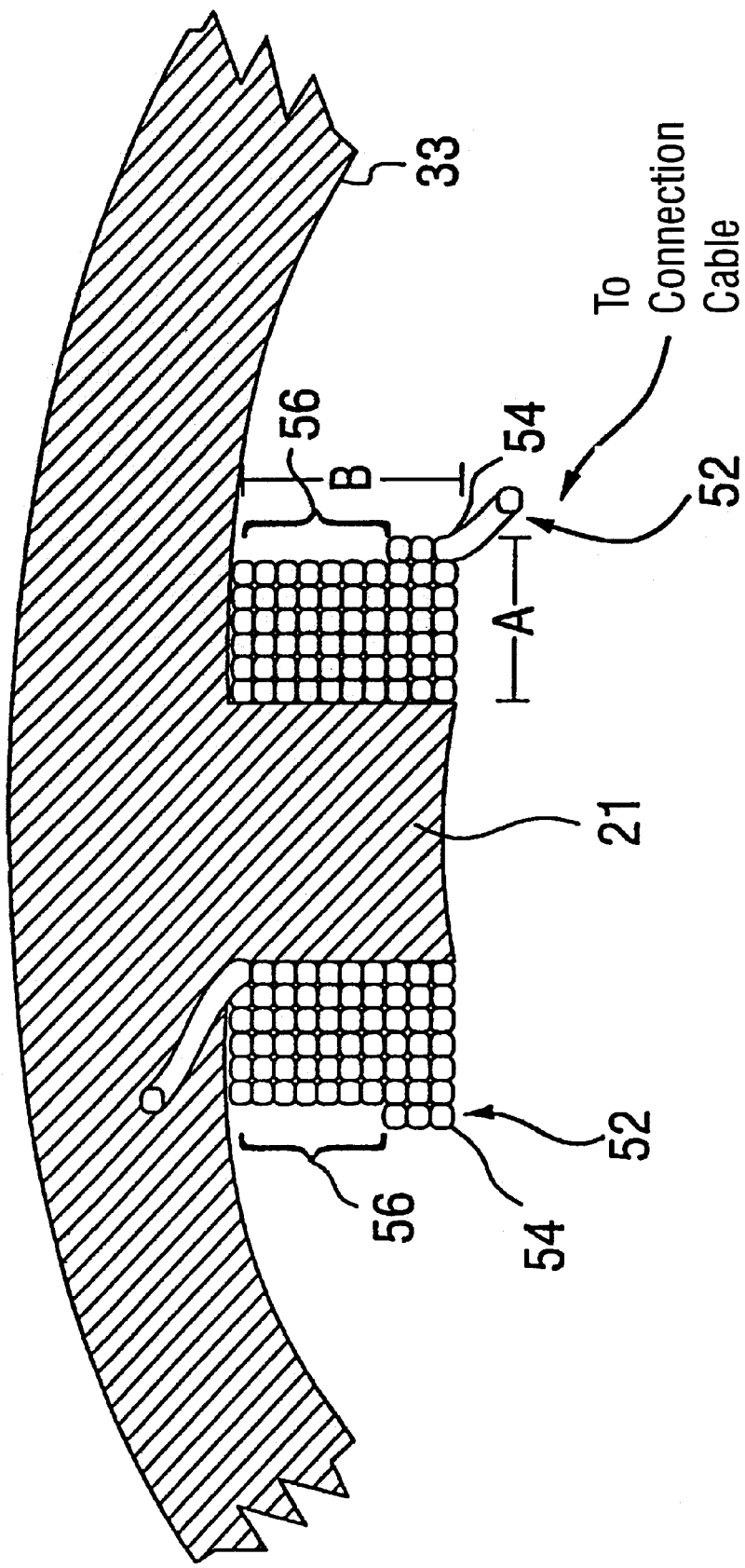
FIG. 6 illustrates an embodiment of the present invention in which air-gaps are introduced into the phase winding to decrease the turn-to-stator capacitance of the outermost winding turns.

FIG. 6 illustrates another aspect of the present invention. As those skilled in the art will recognize, it often occurs that the number of turns associated with a pole in a switched reluctance motor will not always result in the last wound turn being the last turn in a complete layer of turns, as is illustrated in FIG. 5. Typically, the last wound turn is positioned somewhere other than the last turn of a full layer. This is illustrated in FIG. 3A where the last wound turn 36 is the third turn of the final layer in a winding arrangement having ten turns per full layer.

In accordance with the present invention, the outermost layer of turns, if partial, may be positioned, depending on the number of layers, such that the last turn is at the position furthest away from the stator pole 21 (distance A) and the inter-pole region 33 (distance B). This is illustrated in FIG. 6, where the outermost layer 52 is partial and positioned such that the last wound turn 54 is located in the position most distant from the pole 21 and inter-pole region 33. As FIG. 6 indicates, this winding arrangement results in air-gaps 56. Thermally conductive (but electrically insulating) elements could be placed in air-gaps 56 to improve the thermal conductivity of the system. In manufacture, dummy spacers may be used to produce the air-gaps 56.

It should be noted that the particular approach for reducing voltage stress induced winding failures is particularly suitable for switched reluctance motors. The same approach cannot be used with more common varieties of electric motors, such as induction and permanent magnet motors. Referring back to FIG. 3B it may be noted that because the windings are placed in slots, there is no single outer turn that has a relatively low turn-to-ground capacitance. Accordingly, there is no turn particularly suitable for coupling to the connection cable and motor terminal so as to reduce voltage stresses in the winding. While the centrally positioned winding turns would have a relatively low turn-to-ground capacitance compared to the outer turns, it is difficult in practice to couple the connecting cable to such centrally positioned turns. It should be apparent, therefore, that the winding arrangements of the present invention are particularly suited for switched reluctance motors since in switched reluctance motors there is a turn particularly suitable for coupling to a connection cable.

Figure 7:
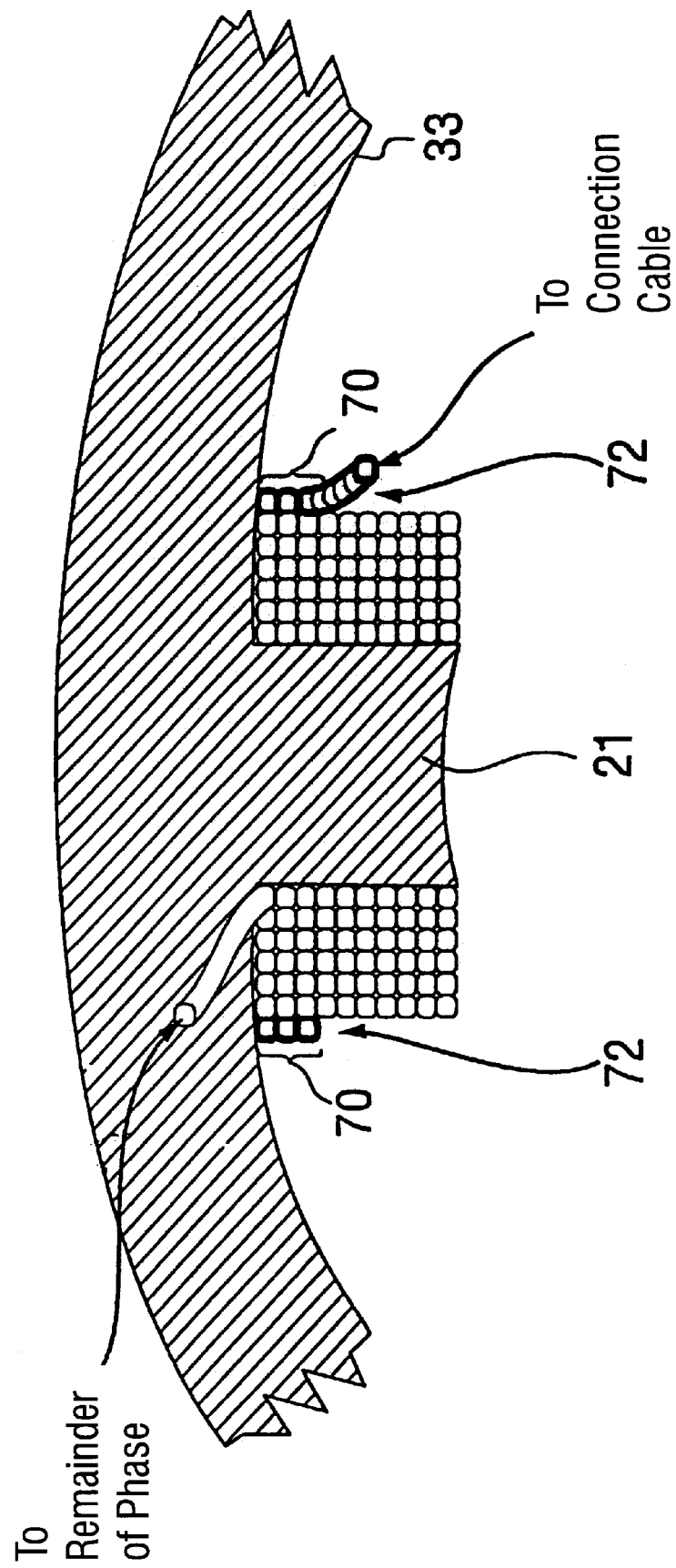
FIG. 7 illustrates an alternate embodiment of the present invention in which additional insulation is provided for the outermost winding turns of a reluctance machine to enable them to better handle the voltage stresses caused by the high frequency voltage pulses.

Alternative embodiments for reducing voltage stress induced failures in switched reluctance motors are contemplated. In one such embodiment, additional insulation is provided for the outermost turns to enable them to better handle the voltage stresses caused by the high frequency or high dV/dt voltage pulses. FIG. 7 generally illustrates this embodiment.

As illustrated in FIG. 7, additional insulating material 72 is provided around the last few turns of the winding. This insulating material 72 can be wrapped around the last few winding turns 70, or an insulating sleeve can be provided for the wire portions that comprise the last few turns. Potential wrapping materials include polyamide film such as KAPTON (a trademark of DuPont) and the like, and potential insulating sleeves include acrylic sleevings, glass sleevings, sleevings formed from glass braid, and similar materials. Although the alternative winding arrangement discussed above (i.e., that with the introduced air-gap 56 in FIG. 6) is not illustrated in FIG. 7, the use of insulation is compatible with that winding arrangement.

Figure 8:
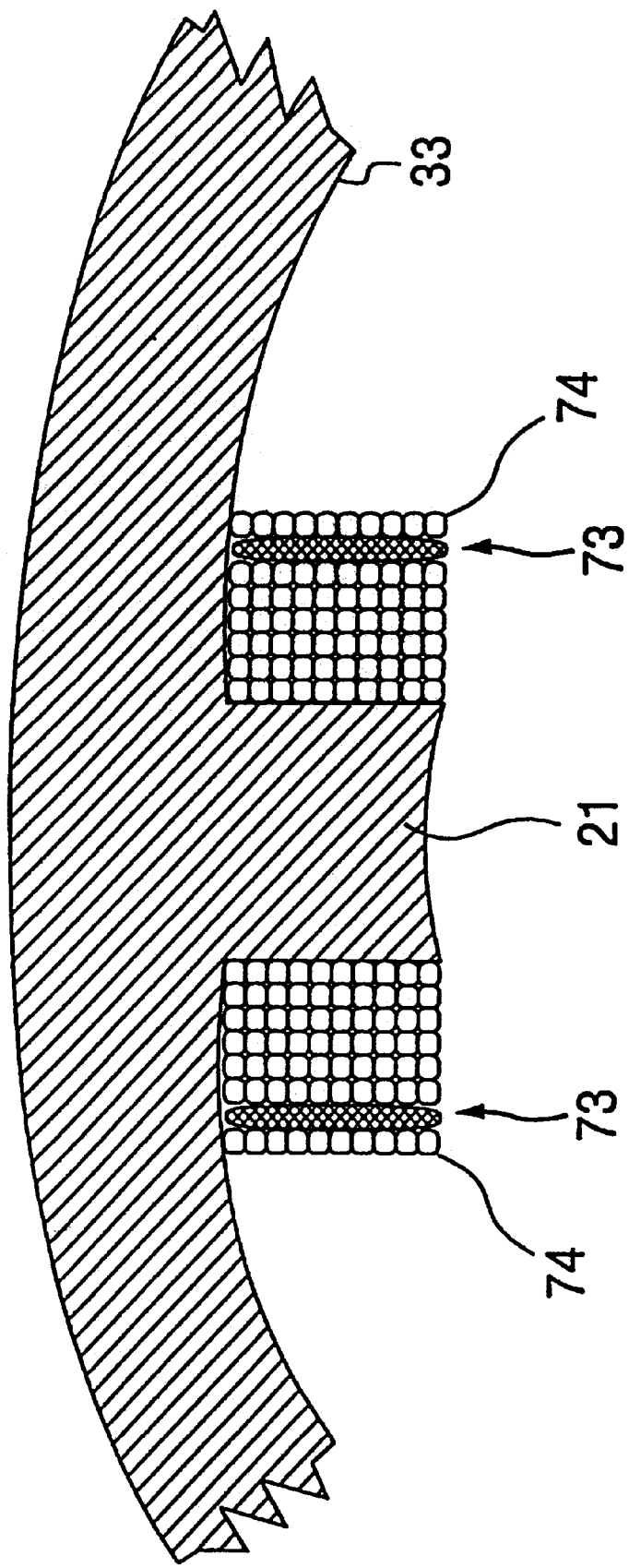
FIG. 8 generally illustrates another embodiment of the present invention in which an insulating sheet is provided between the outermost layer and the immediately inwardly adjacent layer.

Further embodiments are contemplated where an insulating sheet is provided between the outermost layer and the immediately inwardly adjacent layer. This embodiment is illustrated in FIG. 8, where a sheet of insulating material 73 is arranged between the outermost layer 74 and the immediately adjacent inner layer. It is not essential that the sheet of insulating material 73 extend across the entire span of the outermost layer 74, as long as it extends under the last few turns of the winding. The particular composition of the insulating sheet is not essential to the present invention, but should be selected to be a relatively thin material with high dielectric strength and good thermal conductivity. A calendared aramid paper such as NOMEX (a trademark of DuPont) is believed to be a suitable material.

Yet another embodiment is contemplated for reducing winding failures in switched reluctance motors. In this embodiment a conductive layer is used to distribute capacitively the transient voltage spikes that occur over the last few winding turns to other winding turns. As with the first embodiment discussed above, this results in a distribution of the voltage stresses among a greater number of winding turns, and reduces the risk of voltage stress induced winding failure. This embodiment is generally illustrated in FIG. 9.

In this embodiment, a layer of conductive material 76 is sandwiched between two layers of insulating material 78a and 78b. The sandwich of conductive material is then placed between the outermost layer 74 and the next inwardly adjacent layer. A wire or other electrically conductive member 80 connects the last winding turn to the conductive layer 76. The dimensions of the conductive layer 80 are not essential as long as its free ends do not make electrical contact with any other component connected to ground potential. The conductive material 76 may comprise aluminum, copper, conductive plastic, a graphite conductive mat or the like. Embodiments are also contemplated where the sandwich of conductive material is formed by two sheets of metalized plastic, such as metalized KAPTON or metalized NOMEX.

Figure 9:
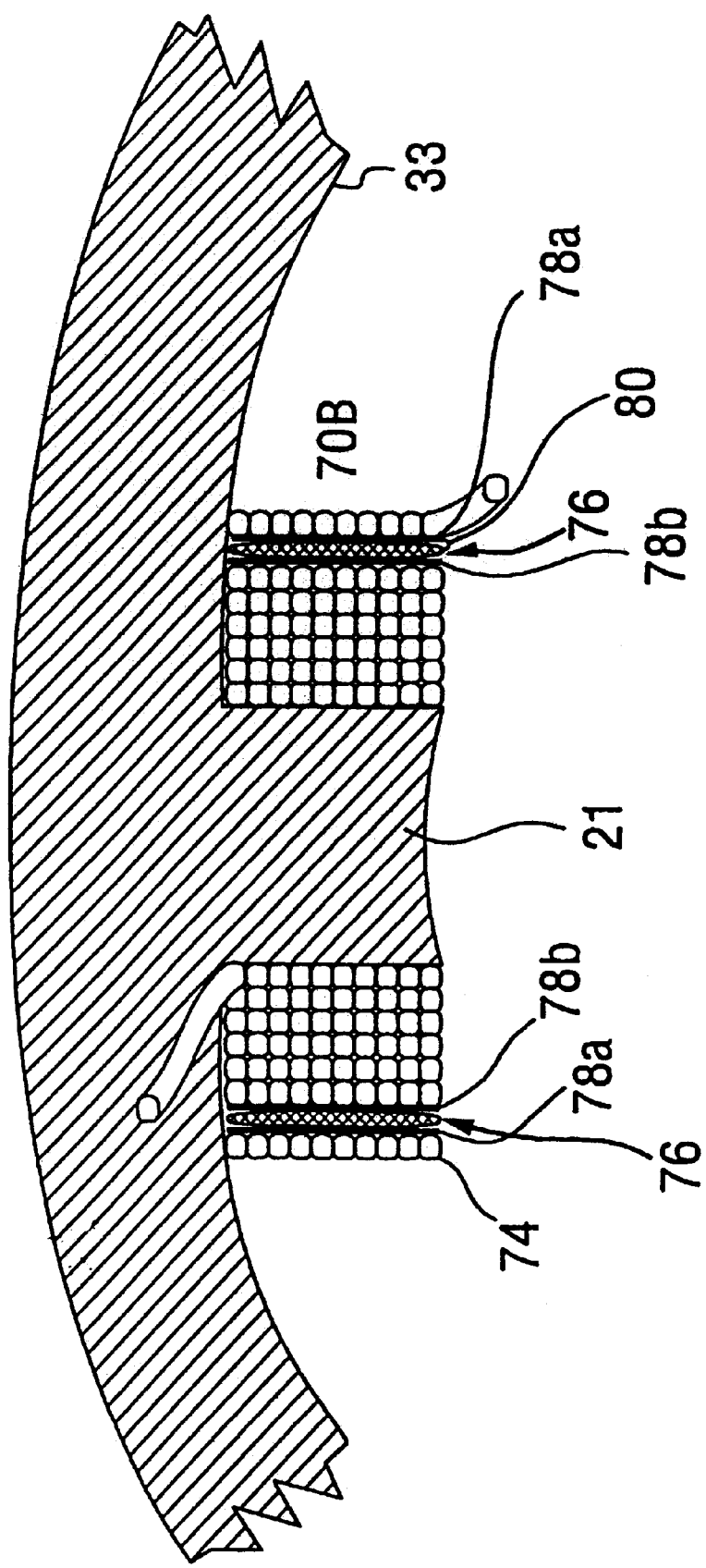
FIG. 9 illustrates yet another embodiment of the present invention in which a conductive layer is used to distribute the voltage spikes that result from the application of high-frequency voltage pulses to the machine.

In the embodiment illustrated in FIG. 9, the conductive sandwich forms a capacitive voltage distributor that distributes the voltage stresses that are placed on the last few winding turns when a high frequency or high dV/dt voltage pulse is applied to the motor. As a review of FIG. 9 illustrates, the combination of the outer layer of winding turns 74, the insulating layer 78a and the conductive layer 76 forms a capacitive element. Accordingly, as the voltage on the outer layer of winding turns begins to rise in response to an applied voltage pulse, the voltage potential of the conductive layer 76 will also begin to rise. Because of capacitive coupling between the capacitive layer 76 and winding turns other than the outermost turns (including the turns comprising the next-to-outermost layer of the winding) the voltage stresses that would otherwise be concentrated in the outermost turns are distributed and shared by other turns in the coil. This distribution of voltage stresses can reduce the likelihood of voltage stress induced winding failure.

As described above, the conductive element 76 serves as a capacitive voltage distributor even if it is not electrically connected to the outermost turns. However, when the conductive element 76 is electrically coupled to the outermost turns, the distribution of the voltage stresses throughout the motor windings will be improved. Accordingly, in embodiments where it is practicable, it may be desirable to use a conductive member 80 to electrically couple the last turn 74 in the coil with conductive element 76.

Figure 10:
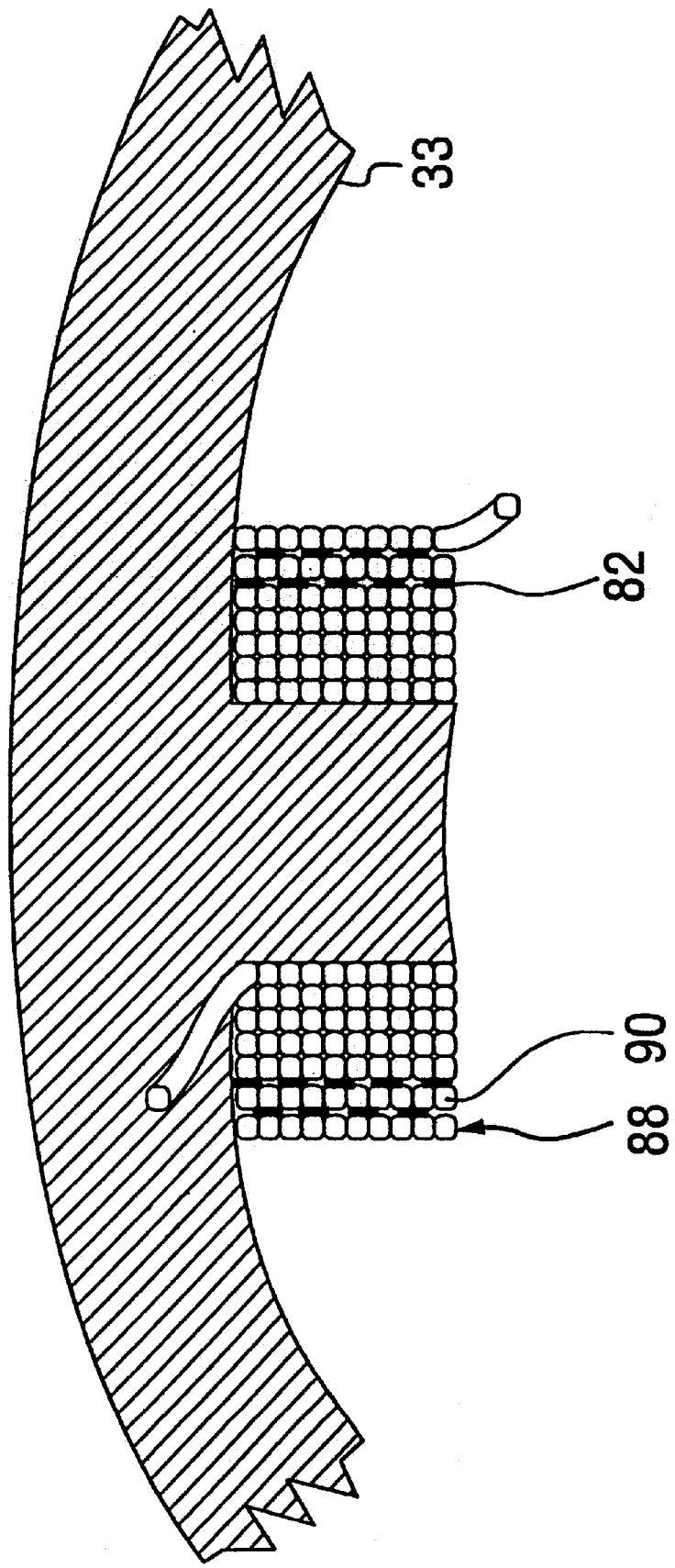
FIG. 10 illustrates a modification of the embodiment illustrated in FIG. 9 in which a capacitive voltage distributor comprises a helically wound strip.

Alternative embodiments are contemplated in which the capacitive voltage distributor formed by the conductive element 76 comprises a helically wound strip rather than a sheet of conductive material sandwiched between insulators. A cross-sectional view of one such embodiment is illustrated in FIG. 10 where a helically wound strip 82, is positioned between the outermost 88 and next adjacent 90 layer of the winding. In FIG. 10 the helically wound strip 82 is also positioned between the layer 90 and the layer adjacent layer 90.

In should be noted that the particular winding arrangement used in switched reluctance motors makes the insertion of insulating sheets or conductive sandwiches relatively easy when compared with the practical difficulties that would be encountered if such approaches were attempted on more common motors where the windings are placed in narrow slots.

While the invention has been described in connection with the illustrative embodiments discussed above, those skilled in the art will recognize that many variations may be made without departing from the present invention. For example, the present invention is applicable to machines with different number of rotor and stator phases than illustrated herein and with different number of coils per phase. Moreover, the present invention is also applicable to machines with series, series and parallel or parallel connections of coils within a phase. Further, the invention is applicable to inverted machines in which the stator is in the center of the machine and the rotor rotates around the outside of the stator. Also, while the invention is described in relation to rotary switched reluctance motors, the skilled person will be aware that a switched reluctance machine can be construed as a linear motor. The moving member of a linear motor is referred to in the art as a rotor. The term 'rotor' used herein is intended to embrace the moving member of a linear motor as well. Accordingly, the above description of several embodiments is made by way of example and not for purposes of limitation. The present invention is intended to be limited only by the spirit and scope of the following claims.

What is claimed is:

1. A switched reluctance machine comprising:
    a stator, the stator comprising a plurality of extending stator poles and inter-pole regions; and
    a plurality of winding coils positioned about the stator poles forming at least one winding phase, wherein each winding phase includes a given winding coil with a first end for connection to an electronic controller and a second end, and wherein the turn-to-stator capacitance at the first end is lower than the turn-to-stator capacitance at the second end;
    wherein the given winding coil comprises a plurality of layers of winding turns including an outermost layer, and the first end extends from the outermost layer and
    wherein the given winding coil comprises a plurality of winding turns and wherein the first end extends from the winding turn positioned at the location most distant from the inter-pole region of the stator associated with the stator pole about which the given winding coil is positioned.

2. A switched reluctance machine comprising:

a stator, the stator comprising a plurality of extending stator poles and inter-pole regions; and a plurality of winding coils positioned about the stator poles forming at least one winding phase, wherein each winding phase has a first coil with a first end electrically connected to an electronic controller to receive signals having a voltage that varies over time, and a second end electrically coupled to another winding coil, and wherein the turn-to-stator capacitance at the first end is lower than the turn-to-stator capacitance at the second end wherein the first coil comprises a plurality of winding turns and wherein the first end extends from the winding turn positioned at the location most distant from the inter-pole region of the stator associated with the stator pole about which the winding coil is positioned.

3. The switched reluctance machine of claim 2 wherein the plurality of winding coils positioned about the stator poles forming the at least one winding phase are connected in series.

4. The switched reluctance machine of claim 2 wherein the plurality of winding coils positioned about the stator poles forming the at least one winding phase are connected in parallel.

5. The switched reluctance machine of claim 2 wherein the said winding coil comprises a plurality of layers of winding turns including an outermost layer, and the first end extends from the outermost layer.

6. A switched reluctance machine comprising:

a stator, the stator comprising a plurality of extending stator poles and inter-pole regions; and a plurality of winding coils positioned about the stator poles forming at least one winding phase, wherein each winding phase includes a winding coil with a first end and a second end, each winding coil having a plurality of layers of winding turns including an outermost layer, the first end extending from the outermost layer such that the first end is accessible for connection to an electronic controller, and wherein the turn-to-stator capacitance at the first end is lower than the turn-to-stator capacitance at the second end.

7. The switched reluctance machine of claim 6 wherein the second end extends from the stator such that the second end is accessible for connection to the electronic controller.

8. The switched reluctance machine of claim 6 wherein the second end is connected to another winding coil.

9. The switched reluctance machine of claim 6 wherein the winding coils are connected in series.

10. A switched reluctance motor comprising a rotor, a stator having stator poles defining inter-pole regions, and a winding arranged throughout at least one of the stator poles, the winding having first and second ends, the first end being arranged adjacent the surface of the inter-pole region and having a first turn-to-stator capacitance, and the second end being arranged remote from the surface of the inter-pole region and having a second lower turn-to-stator capacitance.

* * * * *